(12) United States Patent
Flesch et al.

(10) Patent No.: US 7,463,311 B2
(45) Date of Patent: Dec. 9, 2008

(54) METHOD AND SYSTEM FOR INCLUDING NON-GRAPHIC DATA IN AN ANALOG VIDEO OUTPUT SIGNAL OF A SET-TOP BOX

(75) Inventors: James Ronald Flesch, Tucker, GA (US); Paul Andrew Clancy, Duluth, GA (US)

(73) Assignee: General Instrument Corporation, Horsham, PA (US)

( * ) Notice: Subject to any disclaimer, the term of this patent is extended or adjusted under 35 U.S.C. 154(b) by 1160 days.

(21) Appl. No.: 10/238,468

(22) Filed: Sep. 9, 2002

(65) Prior Publication Data

US 2004/0049781 A1    Mar. 11, 2004

(51) Int. Cl.
*H04N 7/00* (2006.01)
*H04N 11/00* (2006.01)
*H04N 5/445* (2006.01)

(52) U.S. Cl. .................. 348/589; 348/461; 348/465; 348/468; 348/563; 348/598; 348/600

(58) Field of Classification Search ............... 348/461, 348/465, 468, 563, 564, 565, 581, 599, 645, 348/600; 345/589, 591, 592, 600, 603–605
See application file for complete search history.

(56) References Cited

U.S. PATENT DOCUMENTS

| | | | | |
|---|---|---|---|---|
| 4,358,788 A | * | 11/1982 | Burrowes | 348/468 |
| 5,519,450 A | * | 5/1996 | Urbanus et al. | 348/600 |
| 5,671,019 A | * | 9/1997 | Isoe et al. | 348/565 |
| 5,844,615 A | * | 12/1998 | Nuber et al. | 375/240.01 |
| 5,978,046 A | * | 11/1999 | Shintani | 348/589 |
| 6,111,612 A | * | 8/2000 | Ozkan et al. | 348/465 |
| 6,256,070 B1 | | 7/2001 | Frank | |
| 6,271,826 B1 | * | 8/2001 | Pol et al. | 345/589 |
| 6,278,733 B1 | * | 8/2001 | Bennett et al. | 375/240 |
| 6,281,939 B1 | * | 8/2001 | Del Castillo et al. | 348/558 |
| 6,297,797 B1 | | 10/2001 | Takeuchi et al. | |
| 6,510,557 B1 | * | 1/2003 | Thrift | 725/110 |
| 6,532,041 B1 | * | 3/2003 | Monta et al. | 348/468 |
| 6,833,874 B2 | * | 12/2004 | Ozaki et al. | 348/565 |
| 6,912,350 B1 | * | 6/2005 | Vasquez | 386/95 |

(Continued)

FOREIGN PATENT DOCUMENTS

WO    WO 97/35436    9/1997

(Continued)

*Primary Examiner*—Brian P Yenke
(74) *Attorney, Agent, or Firm*—Larry T. Cullen

(57) ABSTRACT

A method and system for including non-graphic data in an analog video output signal of a set-top box. Graphics data is generated from and represents non-graphic data using software or firmware that is executed by a processor, system-on-a-chip integrated circuit, or some other component of the set-top box. The graphics data is alpha blended with video data that is extracted from a digital television signal. This alpha blending results in an alpha blended digital video signal. The alpha blended digital video signal is converted into the analog video output signal by a digital encoder function, which is preferably included in the system-on-a-chip integrated circuit. The alpha blending is also preferably performed by the alpha blending function of the system-on-a-chip integrated circuit. The analog video output signal can then be input into an analog video recorder.

23 Claims, 2 Drawing Sheets

U.S. PATENT DOCUMENTS

| | | | |
|---|---|---|---|
| 6,977,690 B2 * | 12/2005 | Gomikawa | 348/468 |
| 7,139,032 B2 * | 11/2006 | Unemura | 348/555 |
| 7,173,667 B2 * | 2/2007 | Oh | 348/468 |
| 2003/0001978 A1 * | 1/2003 | Smith et al. | 348/714 |
| 2003/0169369 A1 * | 9/2003 | Kahn | 348/468 |

FOREIGN PATENT DOCUMENTS

| | | |
|---|---|---|
| WO | WO 00/05881 | 2/2000 |

* cited by examiner

METHOD AND SYSTEM FOR INCLUDING NON-GRAPHIC DATA IN AN ANALOG VIDEO OUTPUT SIGNAL OF A SET-TOP BOX

FIELD OF THE INVENTION

The present invention relates to the field of generating a video signal with a set top box using alpha blending capabilities of a system-on-a-chip integrated circuit and digital signal processing techniques in software that can be executed by a processor.

BACKGROUND OF THE INVENTION

The advent of computers, interactive electronic communication, the Internet, and other advances in the digital realm of consumer electronics have resulted in a great variety of programming, recording, and viewing options for users who view television programs. A set-top box (STB), for example, is a device that enables a television set to receive and decode both digital and analog television programs. Some STBs can also record television programs; indicate to an analog video recorder, such as a videocassette recorder (VCR), to begin and end recording a television program; insert closed captioning information into the television program; enable the television set to become a user interface to the Internet and perform other functions. STBs are typically necessary to television program viewers who wish to use an analog television set to receive digital broadcasts. STBs are sometimes called receivers. Other devices can perform some of these STB functions such as personal video recorders (PVRs), integrated receiver descramblers (IRDs), satellite receivers, and personal computers. As used hereafter and in the appended claims, unless otherwise specifically denoted, the term "set-top box" will be used to refer expansively to all possible receivers that receive and decode either or both digital and analog television programs.

Some STBs contain a component called a system-on-a-chip (SOC) integrated circuit. The SOC can be an application specific integrated circuit (ASIC), field-programmable gate array (FPGA), or digital signal processor (DSP), for example. The SOC performs a variety of functions and will be explained in more detail below.

Program Delivery Control (PDC) is a data broadcasting system, which carries program-related information for use by STBs. PDC is used in many European countries. In PDC's simplest application, a television program chosen by a user can be recorded by the STB in its entirety, even if the transmission time is different from that published in a program guide. The transmission time could be different if a previous program overruns its allotted time, for example. The PDC data in the signal is used by the STB to extend recording time when necessary. More advanced applications of PDC may, for example, permit recording to be suspended and resumed in synchronism with breaks in television program transmission, such as may occur during a feature film in the event of film breakage.

The functions of the PDC system have been designed mainly around the structure of Video Programming System (VPS) teletext standard data. VPS teletext standard data contains control data that the analog video recorder, such as a VCR, recognizes. Just as PDC allows a STB to digitally record a television program regardless of the program's transmission time, VPS teletext standard data allows the analog video recorder to record a television program regardless of the television program's transmission time.

The VPS teletext standard data is included in a vertical blanking interval (VBI) of the television signal as part of the extended data services (XDS). The VBI is a portion of the television signal that can carry information other than video or audio information.

In many instances, a user desires to use the analog video recorder in conjunction with the STB. For example, the user might have a STB that receives a broadcast television signal and at the same time desires to make a videocassette recording of the broadcasted television program with a VCR. In such a scenario, the VCR would typically receive the VPS teletext standard data via the STB. The STB would have to provide the VPS teletext standard data to the analog video recorder by inserting the VPS teletext standard data into an analog video output of the STB.

However, many STBs are not capable of inserting the VPS teletext standard data into their analog video output because their SOCs do not have state machine support. State machine support allows successful line synchronization in the insertion of the VPS teletext standard data.

One way to insert the VPS teletext standard data into the analog video output of the STB would be to use additional hardware circuitry to generate the necessary line synchronization and data clocks. The additional hardware circuitry would include video encoders, filters, and clocking circuits. This solution is not preferable for a variety of reasons including cost, labor, and potential circuitry failure that would result if additional hardware were installed in pre-existing and new STBs.

Thus, there is a need in the art for a method and system that inserts the VPS teletext standard data into the analog video output of the STB without requiring additional hardware circuitry.

SUMMARY OF THE INVENTION

In one of many possible embodiments, the present invention provides a television program recording system for receiving, decoding, and recording a television program contained in a television signal. The television signal comprises non-graphic data and video data. The recording system comprises an analog video recorder for recording an analog video recording of the television program and a set-top box for receiving the television signal and generating an analog video output signal. The analog video output signal is input into the analog video recorder. The set-top box comprises a system-on-a-chip integrated circuit. Software or firmware is executed by a processor, system-on-a-chip integrated circuit, or some other component in the set-top box, which generates graphics data that represents the non-graphic data. An alpha blending function in the system-on-a-chip integrated circuit alpha blends the graphics data with the extracted video data. This alpha blending results in an alpha blended digital video signal, which is converted to the analog video output signal by a digital encoder function in the system-on-a-chip integrated circuit. The analog video output signal can be input into the analog video recorder.

Another embodiment of the present invention provides a method of including non-graphic data in an analog video output signal of a set-top box. The method comprises alpha blending graphics data that represents the non-graphic data with video data that is extracted from a digital television signal. This alpha blending results in an alpha blended digital video signal. The method also comprises converting the alpha blended digital video signal into the analog video output signal. The alpha blending is performed by an alpha blending function of a system-on-a-chip integrated circuit.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate various embodiments of the present invention and are a part of the specification. Together with the following description, the drawings demonstrate and explain the principles of the present invention. The illustrated embodiments are examples of the present invention and do not limit the scope of the invention.

Throughout the drawings, identical reference numbers designate similar, but not necessarily identical, elements.

DETAILED DESCRIPTION OF THE PREFERRED EMBODIMENTS

The present invention provides a method and system whereby non-graphic data is included in the analog video output signal of the STB without the use of additional hardware circuitry. The non-graphic data is converted into graphics data, which represents the non-graphic data. The graphics data is then alpha blended with digital video data using an alpha blending capability of the SOC. The resulting alpha blended video signal is then converted into the analog video output signal. The non-graphic data can be VPS teletext standard data or any other vertical blanking interval (VBI) based data service, for example. This method and system can be implemented using software or firmware that can be executed with a processor, SOC, or other device contained in the STB. The alpha blending capability of the SOC will be explained in more detail below.

Using the drawings, the preferred embodiments of the present invention will now be explained.

Figure 1:
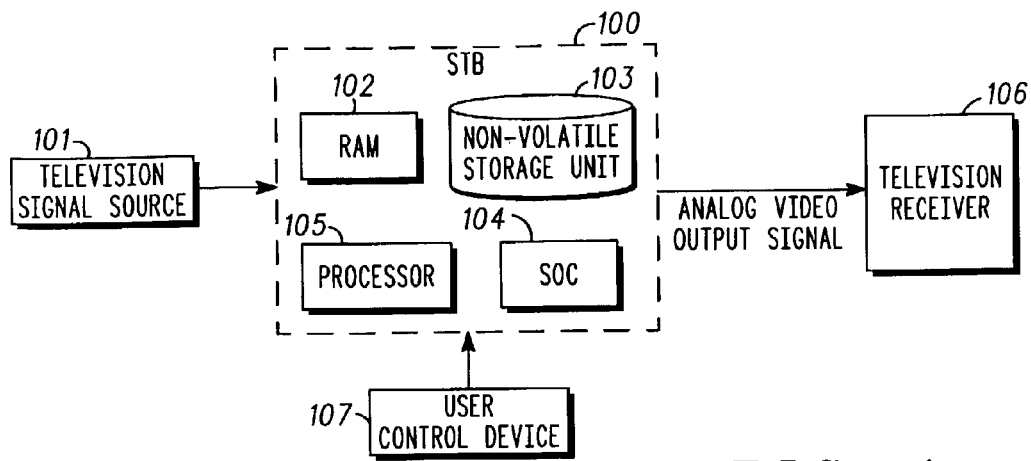
FIG. 1 illustrates an embodiment of the present invention including an exemplary set-top box configuration.

FIG. 1 is an exemplary STB (100) configuration and an embodiment of the present invention. It should be understood that while the invention is described using an STB (100), the invention is not limited solely to STBs. For example, the STB (100) of FIG. 1 can be a PVR, IRD, satellite receiver, or other type of receiver.

Referring to FIG. 1, the STB (100) receives a television signal from a television signal source (101). The television signal source (101) can be, but is not limited to, a cable television box, videocassette recorder (VCR), DVD player, Internet appliance, satellite dish, a video game system, or television antenna. The television signal contains the television program and can be an analog or digital signal. If the television signal is analog, the STB (100) converts the analog television signal to a digital television signal for processing. Thus, as used hereafter and in the appended claims, unless otherwise specifically denoted, the term "television signal" refers to a digital television signal. The digital television signal is preferably a Motion Pictures Expert Group (MPEG) video signal. Although the present invention is described using an MPEG television signal, other types of digital video signals can be used as best serves a particular application.

The STB (100) preferably includes random access memory (RAM) (102), a non-volatile storage unit (103), a processor (105), and a SOC (104). Each of these components will be described below.

The RAM (102) can be synchronous dynamic random access memory (SDRAM) or some other type of temporary storage unit. The RAM (102) has various uses in the STB (100) including the temporary storage of the incoming television signal generated by the television signal source (101) and the temporary storage of an output television signal from the STB (100) that is to be transmitted to a television set (106).

The non-volatile storage unit (103), as shown in FIG. 1, can be, but is not limited to, a hard disk drive or an optical disk drive, such as a digital versatile disc (DVD) drive. The non-volatile storage unit (103) preferably stores recorded television programs, custom settings for the STB (100) as defined by a user, and other information that is associated with the STB (100).

The processor (105), as shown in FIG. 1, can be a central processing unit (CPU) or some other type of processor. The processor (105) performs a variety of functions in the STB (100). For example, the processor (105) can be used to execute software tasks or algorithms that process or record the television signal according to user-invoked commands.

The STB (100) is preferably connected to a television set (106). The television set (106), as shown in FIG. 1, receives an analog video output signal from the STB (100) that is to be displayed on the television set (106). The television set (106) can be, but is not limited to, a video monitor, cathode-ray tube set, flat panel display, projector, or any other device capable of displaying the television program. The television signal is composed of a number of frames, or individual pictures, that can be viewed on the television set (106). A frame is further divided into a number of pixels. Each pixel can be programmed to be a particular color.

The SOC (104), as shown in FIG. 1, is used to perform a variety of functions. For example, in an exemplary STB (100) configuration, the SOC (104) parses the incoming television signal data stream, composed of a stream of bits, and extracts different portions of the data that are to be used in the STB (100). These portions of data can include the bits that represent a particular frame, the bits that contain audio information, the bits that contain the VPS teletext standard data, and other bits that apply to a particular application. Although the present invention is described using the SOC (104), other integrated chips can be used instead of the SOC (104), such as application specific integrated circuits (ASICs), digital signal processors (DSPs), and field-programmable gate arrays (FPGAs).

The exemplary SOC (104) of FIG. 1 preferably possesses the capability to alpha blend graphics data with video data. Alpha blending is a way of mixing two sources of video information onto a single two-dimensional graphics plane. A common application of alpha blending is the combination of two images, on a pixel-by-pixel basis, into one image that is shown on the television set. Alpha blending is nominally intended to permit picture-in-graphics (PIG), picture-in-picture (PIP), or graphics-in-picture (GIP).

Figure 2:
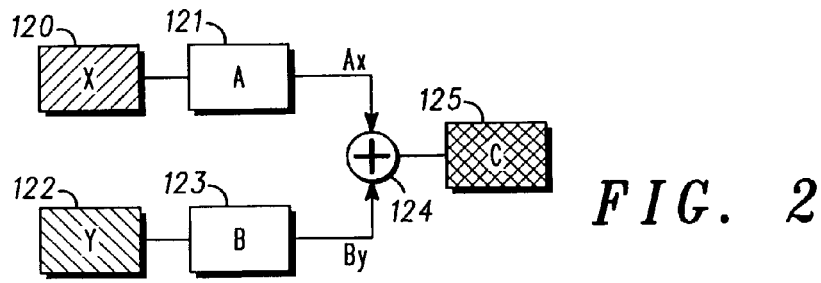
FIG. 2 illustrates a method of alpha blending that can be used to implement an embodiment of the present invention.

FIG. 2 illustrates a method of alpha blending that can be used to implement an embodiment of the present invention. As shown in FIG. 2, a pixel 'x' (120) is multiplied by an alpha factor 'A' (121) resulting in a pixel value 'Ax'. The alpha factor 'A' (121) determines how much of the content of the pixel 'x' (120) contributes to a final pixel value 'C' (125). Likewise, a pixel 'y' (122) is multiplied by another alpha factor 'B' (123) resulting in a pixel value 'By'. The alpha factor 'B' (123) determines how much of the content of the pixel 'y' (122) contributes to the final pixel value 'C' (125). The two pixel values 'Ax' and 'By' are then added together with an adder function (124). The resultant pixel value is denoted as 'C' (125). Thus, a general formula that models the effect of alpha blending is Ax+By=C.

A preferable pixel color structure that the SOC (104; FIG. 1) recognizes is an alpha-red-green-blue (ARGB) color structure. The ARGB color structure allows each pixel to have three channels of color information. These channels determine the amount of red, green, and blue components that are present in the overall pixel color. A fourth channel, the alpha channel, contains the alpha factor information for the pixel. However, other types of color structures could possibly be used as best serves the particular application.

Figure 3:
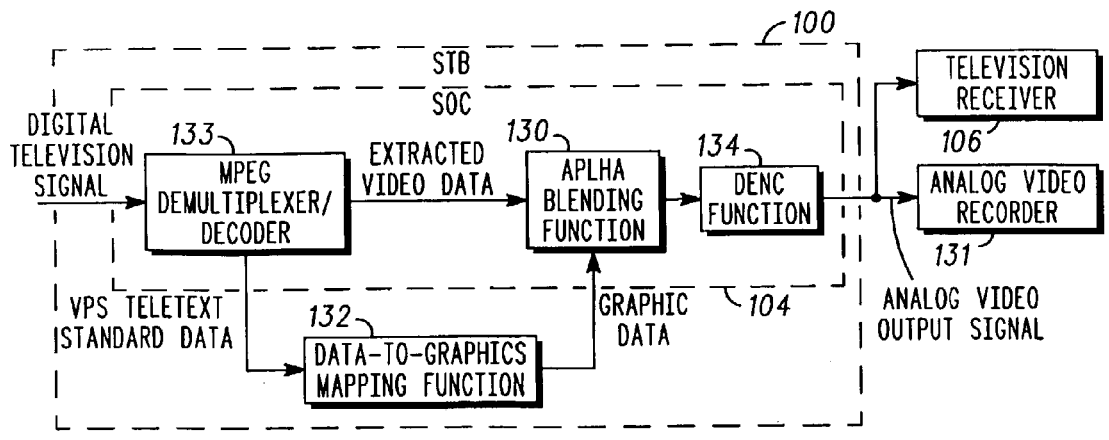
FIG. 3 illustrates an embodiment of the present invention, which includes an exemplary method of including video programming system teletext standard data in the analog video output signal of the set top box using an alpha blending capability of the system-on-a-chip integrated circuit.

FIG. 3 illustrates an exemplary method of including VPS teletext standard data in the analog video output signal of the STB (100) using the alpha blending capability of the SOC (104) according to an embodiment of the present invention. Although FIG. 3 details the inclusion of VPS teletext standard data into the analog video output signal of the STB (100), this embodiment of the present invention applies to the inclusion of all other types of non-graphic data, such as any VBI based data service, into the analog video output signal of the STB (100).

As shown in FIG. 3, an analog video recorder (131) is connected to the STB (100). The analog video recorder (131) accepts an analog video signal and is preferably a VCR. The analog video recorder (131) can be manually programmed by a user to record a television program during a specific time interval. However, the analog video recorder (131) preferably also accepts VPS teletext standard data contained in the analog video signal input and records the television program based on the command data contained in the VPS teletext standard data. The VPS teletext standard data is preferably transmitted on line 16 of the incoming analog video signal to the analog video recorder (131). However, the VPS teletext standard data can also be transmitted on a different line of the input analog video signal.

As shown in FIG. 3, the SOC (104) comprises an MPEG demultiplexer/decoder (133) function, an alpha blending function (130), and a digital encoder (DENC) function (134). These functions are used to extract the VPS teletext standard data and the video data from the digital television signal, alpha blend graphics data that represents the extracted VPS teletext standard data with the extracted video data, and then convert the resultant alpha blended signal into the analog video output signal of the STB (100). These SOC (104) functions are preferably programmed and modified using software commands. The software commands can be written in a variety of programming languages such as the C programming language, for example.

As shown in FIG. 3, the SOC (104) receives a digital television signal that contains VPS teletext standard data. The MPEG demultiplexer/decoder function (133) parses the incoming digital television signal and extracts the video data, VPS teletext standard data, and any other desired data from the incoming digital television signal. After the VPS teletext standard data has been extracted from the incoming digital television signal, a data-to-graphics mapping function (132) resamples, filters, and synchronizes the VPS teletext standard data. The output of the data-to-graphics mapping function (132) is graphics data. The graphics data is then queued up to one of the inputs of the alpha blending function (130). The data-to-graphics mapping function (132), as shown in FIG. 3, is not necessarily performed by the SOC (104). Rather, the data-to-graphics mapping function (132) is a programmable software task that can be performed by the processor (105; FIG. 1), SOC (104), or by some other device present in the STB (100). The data-to-graphics mapping function (132) will now be explained in more detail in connection with FIG. 4.

Figure 4:
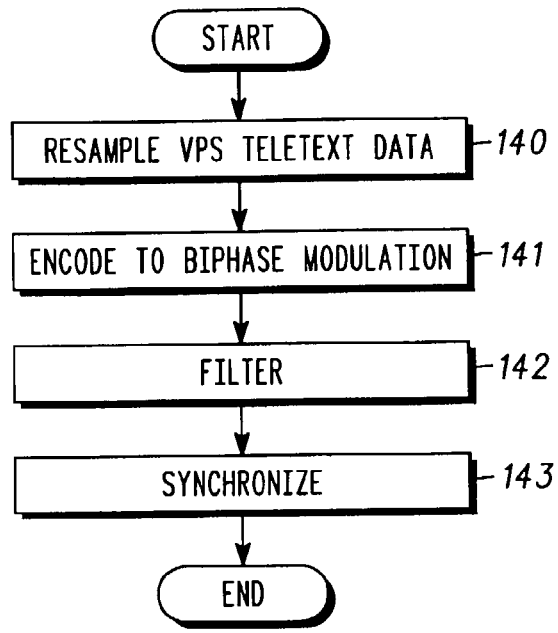
FIG. 4 is a flow chart illustrating an exemplary method that can be used in a data-to-graphics mapping function according to an embodiment of the present invention.

FIG. 4 is a flow chart illustrating an exemplary method that can be used in the data-to-graphics mapping function (132; FIG. 3) and is an embodiment of the present invention. The method of FIG. 4 uses digital signal processing resampling numerical techniques that can be realized by the programmable software task which is executed by the processor (105; FIG. 1), SOC (104), or by some other device present in the STB (100).

As shown in FIG. 4, the method of data-to-graphics mapping begins with the VPS teletext standard data being resampled (140) by the software task. The resampled VPS teletext standard data is graphics seed data that will be used to generate the graphics data. The VPS teletext standard data preferably contains 120 bits per line and is sampled at a rate of 2.5 Megabits per second (Mbps). Although the embodiment of the present invention is described using 120 bits per line and a sample rate of 2.5 Mbps, these values can be changed as best serves a particular application.

The resampled VPS teletext standard data is then encoded to biphase modulation (141), as shown in FIG. 4. Although a biphase modulation pulse shape is preferred, other types of modulation pulse shapes, such as return-to-zero or non-return-to-zero pulse shapes can be used to implement the present invention as best serves the particular application. After the resampled VPS teletext standard data has been encoded to biphase modulation, it is numerically filtered (142) and the resulting filtered and resampled VPS teletext standard data is now in the form of graphics data. This graphics data is then synchronized (143) in a manner such that, when alpha blended with the extracted video data, the graphics data is written into the VBI of line 16 of the resultant alpha blended signal. The method of synchronization will vary as best serves a particular application. For example, in some applications, the graphics data is synchronized such that, when alpha blended with the extracted video data, the graphics data is written into some other line of the VBI.

Referring again to FIG. 3, the synchronized graphics data representing the VPS teletext standard data is routed to one of the inputs of the alpha blending function (130). The video data that is extracted from the digital television signal is also input into the alpha blending function (130). Utilizing the fact that alpha blending can be done on all portions of a video frame, including the VBI portion, which contains the VPS teletext standard data, the alpha blending function (130) alpha blends the graphics data, representing the VPS teletext standard data, with the extracted video data. The output of the alpha blending function (130) is an alpha blended digital video signal comprising the video data with the graphics data, which represents the VPS teletext standard data being included in line 16 of the alpha blended digital video signal.

The alpha blended digital video signal is then input into the DENC function (134). The DENC function (134) converts the alpha blended digital video signal into an analog video signal.

This analog video signal is the analog video output signal of the STB (100) and contains the VPS teletext standard data. The analog video output signal is input into the analog video recorder (131) and the television receiver (106).

As indicated, the present invention can be implemented using programmable software commands that are executed by the processor (105; FIG. 1), SOC (104), or by some other device present in the STB (100). Appendix A is pseudocode that shows a general procedure for resampling the VPS teletext standard data. The pseudocode also shows hardcoded coefficients for the resampled biphase modulation. The algorithm shown in the pseudocode of Appendix A assumes a pixel clock rate of 13.5 megahertz (MHz) and an input VPS teletext standard data rate of 2.5 Megabits per second (Mbps). The data is upsampled by 27, filtered, and then downsampled by 5 in a cascaded operation to achieve a desired rate conversion. The upsample and downsample values can be modified to best serve the desired rate conversion of a particular application.

The pseudocode of Appendix A shows two sampled impulse responses, 'BIT_ONE' and 'BIT_ZERO'. 'BIT_ONE' is the sampled impulse response, which produces a filtered, biphase-encoded '1' for the VPS teletext standard data. Likewise, 'BIT_ZERO' is the sampled impulse response, which produces a filtered, biphase-encoded '0' for the VPS teletext standard data. As shown in the pseudocode, the two sampled impulse responses are anti-symmetric, so it is possible for only one sampled impulse response array to be used and indexed in reverse to obtain the other sampled impulse response.

By extracting specific values in the sampled impulse responses, 'BIT_ONE' and 'BIT_ZERO', as dictated by the information in the VPS teletext standard data that has been resampled, the pseudocode outputs filtered luminance (luma) pixel values that correspond to the VPS teletext standard data. These luma pixel values can then be converted to a graphics data format (e.g.; RGB color format) that can be subsequently alpha blended with the extracted video data.

Appendix B contains actual C code that implements the pseudocode and converts the resulting output luma pixel values to RGB565, a specific type of RGB color format. The resulting RGB565 luma pixel values can be subsequently alpha blended into the analog video output signal. The example code of Appendix B assumes that the VPS teletext standard data input is comprised of all '1's and is an example of one method of implementing the pseudocode. There are numerous methods of actual implementation of the pseudocode in various programming languages.

As shown in the code of Appendix B, in addition to implementing the pseudocode of appendix A, the code also converts the luma pixel values from 32 bit ARGB888 format to 16 bit RGB565 format. Although RGB565 format is preferable, it is not the only color format that can be alpha blended. Other color formats, depending on the particular application, can also be used.

Appendix C contains actual C code with sample functions that can be used to synchronize the luma pixel values such that, when alpha blended with the video data that is extracted from the digital television signal, they will be written into the VBI of line 16 of the resultant alpha blended video signal. If the luma pixel values are to be written into the VBI of a different line, the code of Appendix C will preferably be modified. Once the luma pixel values are alpha blended with the extracted video data, the resultant alpha blended video signal can be converted to an analog video signal and interpreted as the analog video output signal of the STB (100; FIG. 3).

The code of Appendix C contains two functions. The first function, 'GFXvbiByteWrite', writes data to a byte position in the VBI of line 16. The other function, 'GFXvbiInitialize', contains initialization commands for line 16 VBI data. Much of the code in Appendix C formats data for the particular SOC (104; FIG. 3) that is used. Thus, the functions will vary depending on the type of SOC (104; FIG. 3) that is used.

Figure 5:
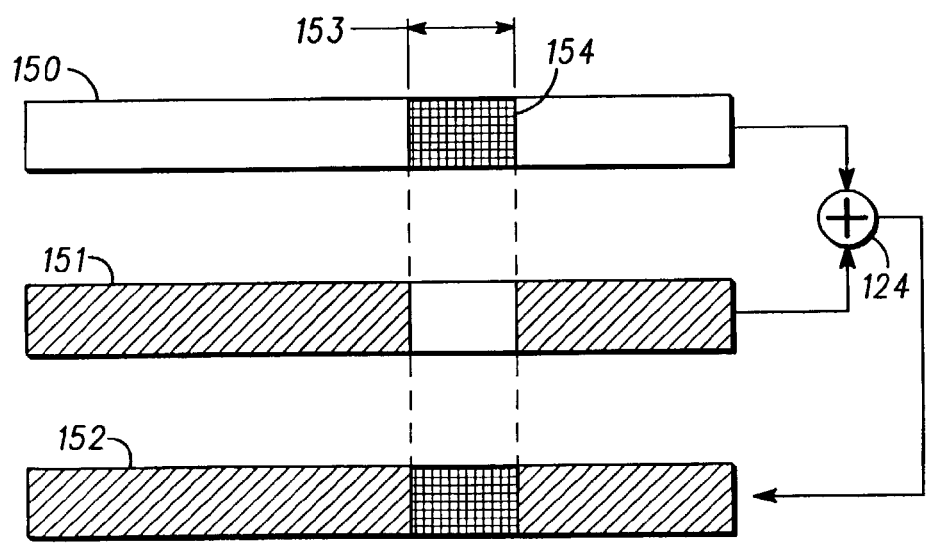
FIG. 5 illustrates a method of alpha blending the graphics data representing the VPS teletext standard data with the video data that is extracted from the digital television signal and can be used to implement an embodiment of the present invention.

FIG. 5 illustrates a method of alpha blending the graphics data representing the VPS teletext standard data with the video data that is extracted from the digital television signal and can be used to implement an embodiment of the present invention.

As shown in FIG. 5, the graphics data (150) contains the luma pixel values (154) that have been synchronized by the data-to-graphics function (132; FIG. 3) such that, when alpha blended with the extracted video data, the luma pixel values are inserted in the VBI (153) of the resultant alpha blended signal's line 16. The other input to the alpha blending function (130; FIG. 3) is the extracted video data (151), which does not contain any information in the VBI (153) of its line 16, as shown in FIG. 5. When the two data streams (150 and 151) are alpha blended using the method explained in connection with FIG. 2, a resulting alpha blended digital video signal (152) contains the information of both the extracted video data (151) and the graphics data representing the VBI teletext standard data (150), as illustrated in FIG. 5. This alpha blended digital video signal (152) can be converted to an analog video signal and provided as an input to the analog video recorder (131; FIG. 3).

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best illustrate the principles of the invention and its practical application. The preceding description is intended to enable others skilled in the art to best utilize the invention in various embodiments and with various modifications as are suited to the particular use contemplated. It is intended that the scope of the invention be defined by the following claims.

APPENDIX A

```
CONST FLOAT BIT_ONE[ ] = { 0.0, 0.053, 0.201, 0.413, 0.643, 0.843,
                           0.970, 0.997, 0.918, 0.750, 0.529, 0.302,
                           0.117, 0.013, 0.0, 0.0, 0.0, 0.0, 0.0, 0.0,
                           0.0, 0.0, 0.0, 0.0, 0.0, 0.0, 0.0 };
CONST FLOAT BIT_ZERO[ ] = { 0.0, 0.0, 0.0, 0.0, 0.0, 0.0, 0.0, 0.0,
                            0.0, 0.0, 0.0, 0.0, 0.0, 0.013, 0.117, 0.302,
                            0.529, 0.750, 0.918, 0.997, 0.970, 0.843,
                            0.643, 0.413, 0.201, 0.053, 0.0 };
#define PTR_STOP 120        // 120 bits max per line
#define DOWNSAMP 5          // each pixel is 5/27 of a bit
#define UPSAMP 27           // also # of taps
INT TapValue = 0;           // init sampling phase accumulator
INT BitPtr = 0;             // pointer to an ASCII array of
                            serial bits
BOOLEAN DATA_AVAILABLE = TRUE; // assume true
WHILE ( BitPtr < 120 && DATA_AVAILABLE ){        //test for data
    TapValue += DOWNSAMP; // increment downsampling count
    XmitBit = *( BitPtr = INT( TapValue/UPSAMP ) ); // get data bit
    SWITCH (XmitBit){
        CASE '0':
            OutputPixel = BIT_ZERO[ TapValue –
                          BitPtr * UPSAMP ];
            BREAK;        // in range of 0-26, as tap values
        CASE '1':
            OutputPixel = BIT_ONE[ TapValue –
                          BitPtr * UPSAMP ];
            BREAK;        // in range of 0-26, as tap values
```

APPENDIX A-continued

```
        DEFAULT:
              DATA_AVAILABLE = FALSE;
    }           // end SWITCH ( XmitBit )
}              // end WHILE ( BitPtr . . . )
.
.
.
}       // end algorithm
```

APPENDIX B

```
/* Includes */
#include <stdio.h>
/* Macros */
#define DOWNSAMP  5    /* desired mode means each pixel is
                          5/27 of a bit */
#define UPSAMP    27   /* also # of taps */
/* convert from 32 bit to 16 bit RGB565 graphics */
#define ARGB8888_TO_RGB565(COL) ( ((COL >> 3) & 0x001f)|\
                                  ((COL >> 5) & 0x07e0)|\
                                  ((COL >> 8) & 0xf800) )
/* Globals */
const float BIT_ONE[ ] =
{
 0.0, 0.053, 0.201, 0.413, 0.643, 0.843,
       0.970, 0.997, 0.918, 0.750, 0.529, 0.302,
       0.117, 0.013, 0.0, 0.0, 0.0, 0.0, 0.0, 0.0,
       0.0, 0.0, 0.0, 0.0, 0.0, 0.0, 0.0
};
const float BIT_ZERO[ ] =
{
 0.0, 0.0, 0.0, 0.0, 0.0, 0.0, 0.0, 0.0,
 0.0, 0.0, 0.0, 0.0, 0.0, 0.013, 0.117, 0.302,
 0.529, 0.750, 0.918, 0.997, 0.970, 0.843,
 0.643, 0.413, 0.201, 0.053, 0.0
};
/* generation of graphical data used to approximate
   2.5 Mbit Biphase modulation for all 1 */
void main (void)
{
 int        TapValue   = 0; // init sampling phase accumulator
 int        BitPtr     = 0; // pointer to an ASCII array of serial bits
 int        StartPtr   = 0;
 int        PixelCount = 0;
 int        CurBit     = -1;
 unsigned char    ucHex;
 unsigned int     uwHex;
 unsigned long int ulHex;
 /* 15 bytes worth of information 15*8 = 120 bits */
 while ( BitPtr < 120)
 {
  /* check for start of byte */
  if ( BitPtr == StartPtr )
  {
   uwHex = BitPtr / 8;
   uwHex = (16 * 27 * uwHex + 5)/ 10;
   printf("\n/* byte %02d, (pixel start %03d, %03d) */\n   ",
      BitPtr/8,
      PixelCount, uwHex);
      /* ready for next byte */
      StartPtr += 8;
  }
  if( CurBit != BitPtr )
  {
   printf("\n   ", BitPtr);
   CurBit++;
  }
  /* calculate graphical representation of signal in required
     RGB565 format, initial 0x12 accounts for DC offset of
     particular graphics chip being used */
  ucHex = 0x12 + ( 0xED * BIT_ONE[ TapValue –
      BitPtr * UPSAMP ]);
  ulHex = ucHex;
  ulHex |= ( 0xFF000000 | ( ulHex << 8) | (ulHex << 16) );
  uwHex = ARGB8888_TO_RGB565(ulHex);
  printf("0x%04x,", uwHex );
```

APPENDIX B-continued

```
  /* increment downsampling count */
  TapValue += DOWNSAMP;
  BitPtr = ( TapValue + 2 ) / UPSAMP;
  PixelCount++;
 }     /* endWhile */
} /* endMain */
```

APPENDIX C

```
/* gray scales data representing an approximation to 2.5 Mbit/s
   biphase modulation for data delivery via line 16 VBI */
#define SETA0(x) *x++=0x1082;*x++=0x1082;*x++=0x1082;
*x++=0x5acb;*x++=0xf7be
#define SETB0(x)
*x++=0x1082;*x++=0x1082;*x++=0x1082;*x++=0x10a2;*x++=0xef5d;
*x++=0x738e
#define SETC0(x) *x++=0x1082;*x++=0x1082;*x++=0x1082;
*x++=0x8c71;*x++=0xdedb
#define SETD0(x)
*x++=0x1082;*x++=0x1082;*x++=0x1082;*x++=0x2965;*x++=0xffff;
*x++=0x4208
#define SETE0(x) *x++=0x1082;*x++=0x1082;*x++=0x1082;
*x++=0xc618;*x++=0xad55
#define SETA1(x)
*x++=0x1082;*x++=0xdedb;*x++=0x8c71;*x++=0x1082;*x++=0x1082
#define SETB1(x)
*x++=0x1082;*x++=0x738e;*x++=0xef5d;*x++=0x10a2;*x++=0x1082;
*x++=0x1082
#define SETC1(x) *x++=0x18e3;*x++=0xf7be;*x++=0x5acb;
*x++=0x1082;*x++= 0x1082
#define SETD1(x)
*x++=0x1082;*x++=0xad55;*x++=0xc618;*x++=0x1082;*x++=0x1082;
*x++=0x1082
#define SETE1(x) *x++=0x4208 ;*x++=0xffff;*x++=0x2965;
*x++=0x1082;*x++=0x1082
#define SETXX(x)
*x++=0x1082;*x++=0x1082;*x++=0x1082;*x++=0x1082;*x++=0x1082
/* this must be set up to point to buffer used for line 16
  How this is done will be totally dependant upon graphics chip used */
UWORD *gpuwVBI;
/**************************************************************
******
*
* Name: GFXvbiByteWrite( )
*
* Purpose:
*   This function writes a data to a byte position in the VBI line 16
*   Note the data written depends on where in the line a bit starts
*   so the data for a 0 at first bit is different than at second bit
*   the sequence does repeat after 5 bits though.
*
* Inputs:
*   UCHAR ucBytePos - byte position should be in range 1 . . . 15
*   UCHAR ucVal - value to write 0 . . . 255
*
* Outputs:
*   None
*
* Returns:
*   None
*
**************************************************************
*****/
void GFXvbiByteWrite ( UCHAR ucBytePos, UCHAR ucVal)
{
 register UWORD    *pwBuf;
        UWORD    uwSeq;
        UWORD    uwPixelStart;
        UCHAR    ucMask;
 /* calculate pixel starting position (a pixel is 5/27th of a bit) */
 uwPixelStart = (2 * ( ((ucBytePos – 1) * 8 ) * 27 ) +5 ) / 10;
 /* set up to point at where to write first data bit in line */
 pwBuf = gpuwVBI + uwPixelStart;
 /* calculate the starting sequence */
 uwSeq = ((ucBytePos – 1) * 8 ) % 5;
 /* loop for each bit in byte, MSB first*/
```

APPENDIX C-continued

```
  for ( ucMask = 0x80; ucMask !=0; ucMask >>= 1 )
  {
    /* test if bit is set */
    if( ucMask & ucVal )
    {
      /* bit is set so write correct data for 1 */
      switch ( uwSeq )
      {
        case 0:
          SETA1(pwBuf);
          break;
        case 1:
          SETB1(pwBuf);
          break;
        case 2:
          SETC1(pwBuf);
          break;
        case 3:
          SETD1(pwBuf);
          break;
        case 4:
          SETE1(pwBuf);
          break;
      }
    }
    else
    {
      /* bit is clear so write correct data for 0 */
      switch ( uwSeq )
      {
        case 0:
          SETA0(pwBuf);
          break;
        case 1:
          SETB0(pwBuf);
          break;
        case 2:
          SETC0(pwBuf);
          break;
        case 3:
          SETD0(pwBuf);
          break;
        case 4:
          SETE0(pwBuf);
          break;
      }
    }
    /* move sequence along */
    if( ++uwSeq > 4)
    {
      uwSeq = 0;
    }
  }
} /* endof GFXvbiByteWrite( ) */
/*************************************************************
******
*
* Name: GFXvbiInitialize( )
*
* Purpose:
*   This function initializes line 16 VBI data to all 0xff, except
*   byte 2 which is set to illegal 1X111010 sequence to indicate start code
*
* Inputs:
*   None
*
* Outputs:
*   None
*
* Returns:
*   None
*
*************************************************************
*****/
void GFXvbiInitialize (void)
{
  register UWORD *pwBuf;
    ULONG ulCount;
  /* loop to set all bytes 1through 15 to 0xff */
```

APPENDIX C-continued

```
  for ( ulCount = 1; ulCount <= 15; ulCount++ )
  {
    GFXvbiByteWrite ( ulCount, 0xff );
  } /* end for */
  /* set pointer to start of second byte
  (43 is used since a pixel is 5/27th of a bit) */
  pwBuf = gpuwVBI + 43;
  /* choose correct sequence for position in buffer, sequence repeats
  after 5 bits, so if we were at pixel 0 in line, sequence would be
  ABCDEABC, the second byte is DEABCDEA, the first E is replaced
  by illegal 00 and sequence doesn't matter in this case! */
  SETD1(pwBuf);
  SETXX(pwBuf);
  SETA1(pwBuf);
  SETB1(pwBuf);
  SETC1(pwBuf);
  SETD0(pwBuf);
  SETE1(pwBuf);
  SETA0(pwBuf);
} /* endof GFXvbiInitialize( ) */
```

What is claimed is:

1. A method of including non-graphic data in an analog video output signal of a set-top box, said method comprising:

extracting said non-graphic data from said digital television signal to obtain extracted non-graphic data;

resampling said extracted non-graphic data to obtain graphics seed data;

encoding said graphics seed data to a modulation pulse shape to obtain encoded graphics data;

alpha blending said encoded graphics data that represents said non-graphic data with video data that is extracted from a digital television signal resulting in an alpha blended digital video signal; and converting said alpha blended digital video signal to said analog video output signal, said alpha blending being performed by an alpha blending function of a system-on-a-chip integrated circuit.

2. The method of claim 1, further comprising:

filtering said encoded graphics seed data to obtain said encoded graphics data, said graphics data comprising luma pixel values that correspond to said non-graphic data; and synchronizing said graphics data so that, upon alpha blending said graphics data with said extracted video data, said graphics data is included in a vertical blanking interval of a line of said alpha blended digital video signal.

3. The method of claim 2, further comprising converting said luma pixel values from alpha-red-green-blue color format to red-green-blue color format before said alpha blending of said encoded graphics data with said extracted video data.

4. The method of claim 2, further comprising extracting values from an array of hardcoded impulse response values to obtain said luma pixel values.

5. The method of claim 1, wherein said non-graphic data comprises vertical blanking interval data.

6. The method of claim 5, wherein said vertical blanking interval data comprises video programming system teletext standard data.

7. A television program recording system for receiving, decoding, and recording a television program contained in a television signal, said television signal comprising non-graphic data and video data, said system comprising:

a set-top box for receiving said television signal and generating an analog video output signal, said analog video output signal being input into said analog video recorder, said set-top box comprising a system-on-a-chip integrated circuit;

demultiplexer/decoder function which extracts said non-graphic data and said video data from said television signal and outputs extracted non-graphic data and extracted video data a data-to-graphics mapping function which accepts said extracted non-graphic data from said demultiplexer/decoder function, resamples said extracted non-graphic data to obtain graphics seed data, encodes said graphics seed data to a modulation pulse shape to obtain encoded graphics seed data, filters said encoded graphics seed data to obtain said graphics data which comprises luma pixel values that correspond to said non-graphic data, and synchronizes said graphics data so that, upon alpha blending said graphics data with said extracted video data, said graphics data is included in a vertical blanking interval of a line of said alpha blended digital video signal.

8. The system of claim 7, wherein said television signal is a digital television signal.

9. The system of claim 7, wherein said non-graphic data comprises vertical blanking interval data.

10. The system of claim 9, wherein said vertical blanking interval data comprises video programming system teletext standard data.

11. The system of claim 7, wherein said demultiplexer/decoder further comprises a Motion Picture Expert Group demultiplexer/decoder function.

12. The system of claim 7, wherein said line is line sixteen of said alpha blended digital video signal.

13. The system of claim 7, wherein said modulation pulse shape is a biphase modulation pulse shape.

14. The system of claim 7, wherein said graphics data is in red-green-blue color format.

15. The system of claim 7, wherein said system-on-a-chip integrated circuit is an application specific integrated circuit.

16. The system of claim 7, wherein said system-on-a-chip integrated circuit is digital signal processor.

17. The system of claim 7, wherein said set-top box is a personal computer.

18. The system of claim 7, wherein said component in said set-top box that generates said graphics data is a processor.

19. The system of claim 7, wherein said component in said set-top box that generates said graphics data is said system-on-a-chip integrated circuit.

20. A system for including non-graphic data in an analog video output signal of a set-top box, said set-top box receiving a digital television signal comprising said non-graphic data and video data, said system comprising:

decoder for extracting said non-graphic data and video data from said digital television signal to obtain extracted non-graphic data and extracted video data;

a mapping function for generating graphics data that represents said non-graphic data, the mapping function configured for:

resampling said extracted non-graphic data to obtain graphics seed data;

encoding said graphics seed data to a modulation pulse shape to obtain encoded graphics seed data, filtering said encoded graphics seed data to obtain said graphics data, said graphics data comprising luma pixel values that correspond to said non-graphic data, and synchronizing said graphics data so that, upon alpha blending said graphics data with said extracted video data, said graphics data is included in said analog video output; and an alpha blending function for alpha blending said graphics data with said video data resulting in an alpha blended digital video signal that is converted to said analog video output signal.

21. The system of claim 20, wherein said graphics data is included in a vertical blanking interval of a line of said alpha blended digital video signal.

22. The system of claim 21, wherein the mapping function is further configured for converting said luma pixel values from alpha-red-green-blue color format to red-green-blue color format before said alpha blending of said graphics data with said extracted video data.

23. The system of claim 21, wherein the mapping function is further configured for extracting values from an array of hardcoded impulse response values to obtain said luma pixel values.

* * * * *

UNITED STATES PATENT AND TRADEMARK OFFICE
CERTIFICATE OF CORRECTION

PATENT NO. : 7,463,311 B2  Page 1 of 1
APPLICATION NO. : 10/238468
DATED : December 9, 2008
INVENTOR(S) : Flesch et al.

It is certified that error appears in the above-identified patent and that said Letters Patent is hereby corrected as shown below:

Title Page;
On the Face Page, in Field (51), under "Int. Cl." in Column 1, Line 4, below "H04N 5/445", please insert --H04N 9/74, 76--

COLUMN 13:
Line 7: In Claim 7, after "data", please insert --and;--

COLUMN 14:
Line 10: In Claim 20, please insert --a--, before "decoder"

Signed and Sealed this

Fourth Day of August, 2009

JOHN DOLL
*Acting Director of the United States Patent and Trademark Office*